Jan. 2, 1934.  E. E. DAVIS  1,941,790

REAMER

Filed May 21, 1930

INVENTOR:
Emery E. Davis
by Carr & Carr Crowley
HIS ATTORNEYS

Patented Jan. 2, 1934

1,941,790

UNITED STATES PATENT OFFICE 1,941,790

REAMER

Emery E. Davis, St. Louis, Mo.

Application May 21, 1930. Serial No. 454,281

2 Claims. (Cl. 77—72)

This invention relates to reamers particularly adapted for use in finishing holes in metal. It has for its principal objects to produce a reamer which will accurately and smoothly finish the walls of such holes, to provide for the ready adjustment, removal and replacement of the blades of the reamer, and to provide for simplicity and cheapness of construction and compactness of design. The invention consists in the parts and in the combinations and arrangements of parts hereinafter described and claimed.

Figure 1:
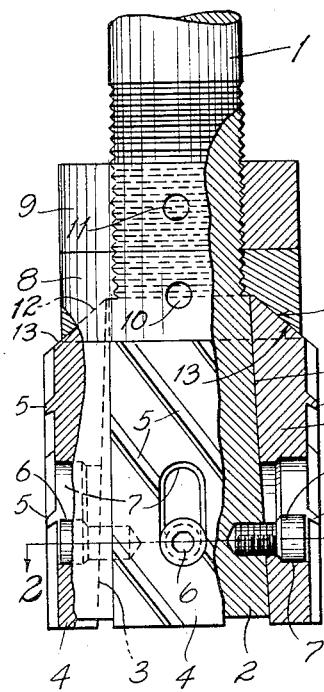
Figure 3:
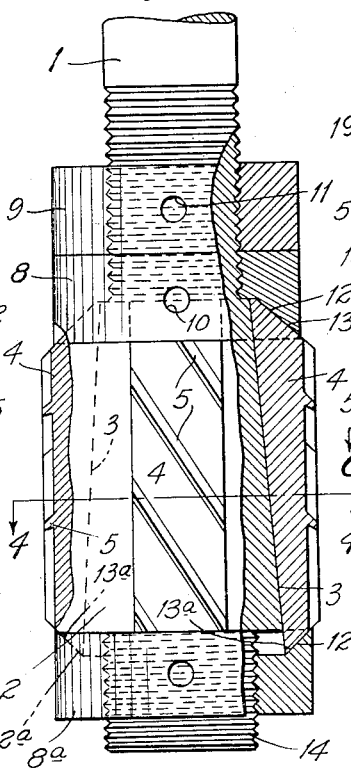
Figure 5:
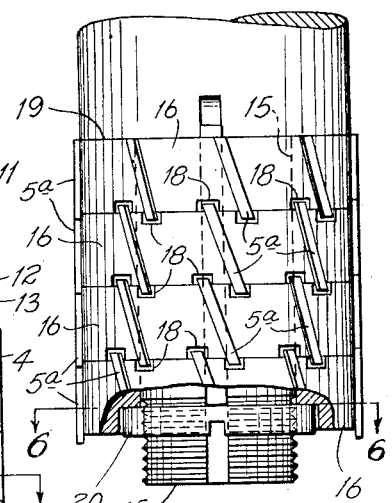
Figure 2:
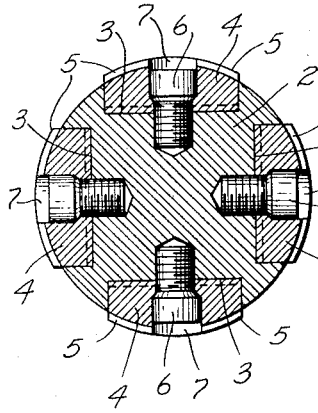
Figure 4:
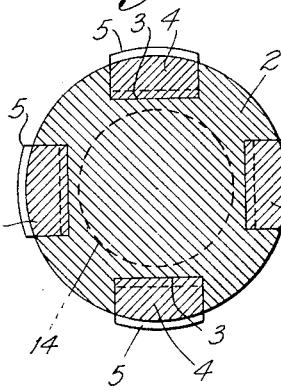
Figure 6:
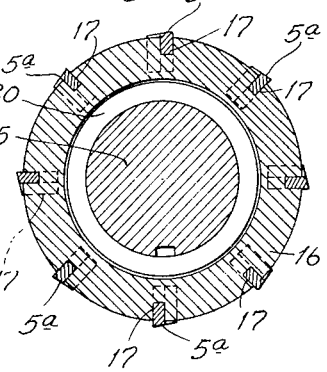

In the accompanying drawing, which forms part of this specification and wherein like symbols refer to like parts wherever they occur, Fig. 1 is a side elevation, partly in longitudinal section of a reamer embodying my invention, Fig. 2 is a transverse cross-section on the line 2—2 of Fig. 1, Fig. 3 is a view similar to Fig. 1 illustrating a modified form of reamer, Fig. 4 is a transverse section on the line 4—4 of Fig. 3, Fig. 5 is a side elevation of another modified construction of reamer; and Fig. 6 is a transverse cross-section on the line 6—6 of Fig. 5.

The reamer shown in Figs. 1 and 2 of the accompanying drawing comprises an externally threaded shank member 1 provided at its outer or forward end with a cylindrical head portion 2. The exterior surface of the cylindrical head portion 2 of the reamer is provided with diametrically opposed longitudinal channels 3, within which are seated rectangular cutter blocks 4 whose exterior surfaces are convexly curved from side to side in arcs described about the rotary axis of the reamer as a center. The convexly curved exterior surfaces of the blocks are provided with a series of ribs 5, which form the cutting teeth or blades of the reamer. As shown in the drawing, the blades 5 are disposed at an oblique angle to the longitudinal axis of the reamer so as to cut with a shearing action and thereby produce a very smooth finish on the wall of the opening. The teeth or blades 5 of the several cutter blocks may be arranged at the same angle, or alternate blocks may be provided with teeth disposed at a reverse angle.

The cutter blocks 4 are held against movement in the channels 3 preferably by means of screws 6 which extend through longitudinal slots 7 provided therefor in said blocks and are threaded into radial holes provided therefor in the bottoms of said channels. As shown in the drawing, the slots 7 are enlarged at the outer face of the cutter block for the reception of the heads of the screws 6 so that they do not extend beyond the outer faces of said blocks. The bottoms of the cutter block receiving channels 3 are inclined outwardly from their rear to their forward ends; and, likewise, the inner faces of the cutter blocks 4 are inclined at an angle corresponding to the angle of inclination of the bottoms of said channels, whereby said blocks are adapted to be adjusted radially with respect to the cylindrical head portion of the reamer when they are slid lengthwise of said channels. With this arrangement, the cutter blocks may be adjusted radially of the reamer head to compensate for wear and to fit bores of different diameters.

The cutter blocks 4 are slid longitudinally of the channels 3 in the reamer head 1 by means of an adjusting nut 8 threaded on the externally threaded shank portion 1 of the reamer adjacent to the inner ends of said block. A lock nut 9 is also threaded on the shank 1 of the reamer for locking the adjusting nut 8 in the desired adjusted position. The nuts 8 and 9 are provided with sockets 10 and 11, respectively, whereby they may be manipulated by means of a spanner or pin wrench. The adjusting nut 8 is provided opposite the inner ends of the cutter blocks 4 with a circular recess having a conical band or surface 12, which slopes downwardly and outwardly and is adapted to bear or abut against similar conical surfaces 13 formed on the adjacent inner ends of said cutter blocks. By this arrangement, rotation of the adjusting nut 8 in the proper direction causes the conical surface 12 of the recess in said nut to simultaneously engage the conical inner ends 13 of all of the blocks and thus move them longitudinally of the channels 3 towards the outer ends thereof. During this longitudinal movement of the cutter blocks, they will be moved radially outward by reason of the inclined bottoms of the channels and the corresponding inclination of the inner surfaces of the blocks, thereby permitting said blocks to be adjusted to effect a cut of the diameter desired. When the cutter blocks have been properly adjusted, the adjusting nut 8 is locked against rotation by means of the lock nut 9; and the cutter blocks are then clamped in the channels against movement therein by tightening the lock screws 6.

In the modified construction shown in Figs. 3 and 4, the cutter blocks are locked in the channels or slideways provided therefor in the reamer head by an arrangement which dispenses with the lock screws 6 and slots 7. In this construction an adjusting nut 8a is threaded on a threaded stud 14 on the outer end of the cutter head and is provided with an annular groove having a conical surface 12a adapted to cooperate with conical surfaces 13a on the forward ends of the cutter blocks. With this arrangement, the cutter blocks are adjusted by the nuts 8 and 8a, which also serve to lock said blocks in the channels.

In the modified construction shown in Figs. 5 and 6, the forward end of the reamer is provided with a cylindrical stud 15 upon which are sleeved a series of cutter blocks in the form of rings 16, whose peripheral surfaces are provided with a series of channels or grooves 17 having blades or teeth 5a pressed therein that are made of a high grade cutting alloy, such as high speed steel or cemented tungsten carbide. The grooves 17 are disposed at an oblique angle to the reamer axis whereby the blades are adapted to cut with a shearing action so as to produce a very smooth finish and, at the same time, prolong the life of their cutting edges. The blades of each ring are staggered with relation to the blades of the ring adjacent thereto and are made long enough so that the end portions of the blades of one ring overlap the end portions of the blades of an adjacent ring. The end faces of the rings are provided with notches 18 adapted to accommodate the projecting ends of the blades of adjacent rings. The rings are removably held on the stud 15, between a shoulder 19 at the inner end thereof and a nut 20, which is threaded on the outer end of the stud.

The hereinbefore described reamer has numerous advantages. It provides an increased number of cutting edges, thereby prolonging the life of the tool and at the same time securing a high degree of accuracy; it also secures a very smooth finish, due to the shearing cut provided by the obliquely disposed blades; it permits the blades to be easily and accurately adjusted, removed and replaced; and it permits the angle of obliquity of the reamer blades to be readily changed by means of sets of cutter blocks having blades disposed at different angles.

Obviously, changes may be made without departing from the invention and I do not wish to be limited to the precise construction shown.

What I claim is:

1. A reamer comprising a body portion, a plurality of axially alined annular cutter blocks fixed thereto in abutting relation and having grooves in their peripheral surfaces that extend from end to end of said blocks and are disposed at an oblique angle to the longitudinal reamer axis, and blades mounted in the grooves in said blocks and projecting beyond the respective blocks at the abutting ends thereof, the corresponding ends of the blades of adjacent cutter blocks being spaced apart peripherally of said reamer and overlapping longitudinally thereof.

2. A reamer comprising a body portion, a series of axially alined annular cutter blocks fixed thereto in abutting relation and having straight grooves in their peripheral surfaces disposed at the same oblique angle to the longitudinal reamer axis, and blades of high grade cutting alloy mounted in the grooves in said blocks and projecting beyond the respective blocks at the abutting ends thereof, the corresponding ends of the blades of adjacent blocks being spaced apart peripherally of said reamer and overlapping longitudinally thereof, said cutter blocks being provided between the blades thereon with notches for accommodating the projecting ends of the blades of adjacent cutter blocks.

EMERY E. DAVIS.